United States Patent [19]
Sieber

[11] Patent Number: 5,179,837
[45] Date of Patent: Jan. 19, 1993

[54] WAVE POWERED ENERGY GENERATOR

[76] Inventor: J. D. Sieber, 10 Elena Ct., Georgetown, Ontario, Canada, L7G 4Z2

[21] Appl. No.: 679,106

[22] Filed: Apr. 2, 1991

[51] Int. Cl.$^5$ ............................................. F03B 13/12
[52] U.S. Cl. ........................................ 60/500; 60/398; 60/497; 417/331
[58] Field of Search ............... 60/497, 500, 505, 398; 417/330–334; 290/53

[56] References Cited

U.S. PATENT DOCUMENTS

| | | |
|---|---|---|
| 644,093 | 2/1900 | Place . |
| 1,264,737 | 4/1918 | Woods . |
| 1,665,140 | 4/1928 | Master . |
| 3,487,228 | 12/1969 | Kriegel . |
| 3,515,889 | 6/1970 | Kammerer . |
| 4,203,294 | 5/1980 | Budal et al. ........................... 60/497 |
| 4,204,406 | 5/1980 | Hopfe ................................... 60/398 |
| 4,408,454 | 10/1983 | Hagen et al. ......................... 60/500 |
| 4,466,244 | 8/1984 | Wu ................................ 60/497 XR |
| 4,560,884 | 12/1985 | Whittecar ............................. 290/42 |
| 4,622,473 | 11/1986 | Curry ................................... 290/53 |
| 4,754,157 | 6/1988 | Windle ................................. 290/53 |

Primary Examiner—Allen M. Ostrager
Attorney, Agent, or Firm—Marks & Murase

[57] ABSTRACT

A method and device are provided for generating energy from the motion of waves. Fluid is conveyed through a series of fluid pressurization units, each unit incrementally increasing the pressure of the fluid as the fluid passes under the force of differential pressure within that unit. The pressurized fluid from a preceding unit is outlet from that unit and input into the succeeding unit in series. Each unit includes a first member and an associated second member, the first member being immersed in or floating on the surface of a body of water, the first member rising and falling with the rise and fall of wave motion, and the second member being submerged and anchored. The fluid is pressurized as the result of the relative movement between the first and second members as the fluid passes through a unit. The pressurized fluid may then be used to drive turbines and electric generators or other energy conversion devices.

23 Claims, 6 Drawing Sheets

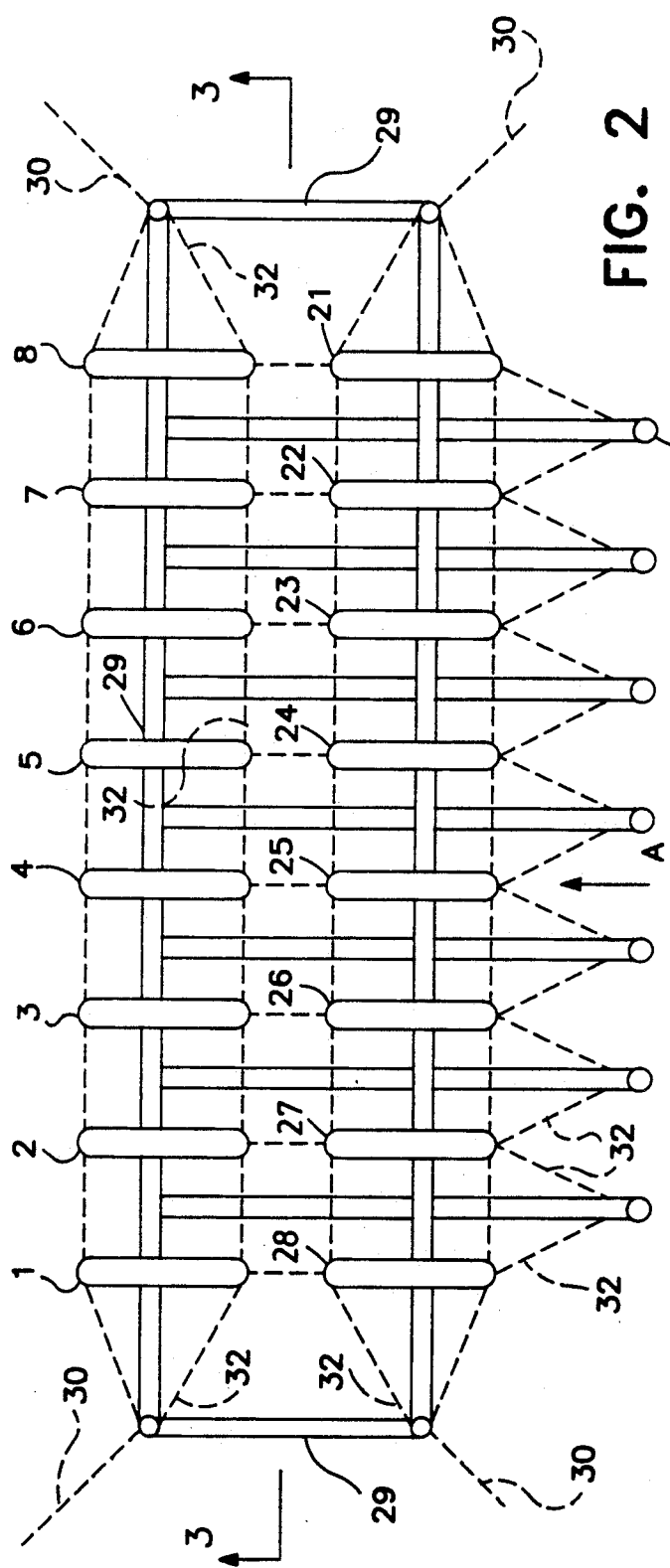
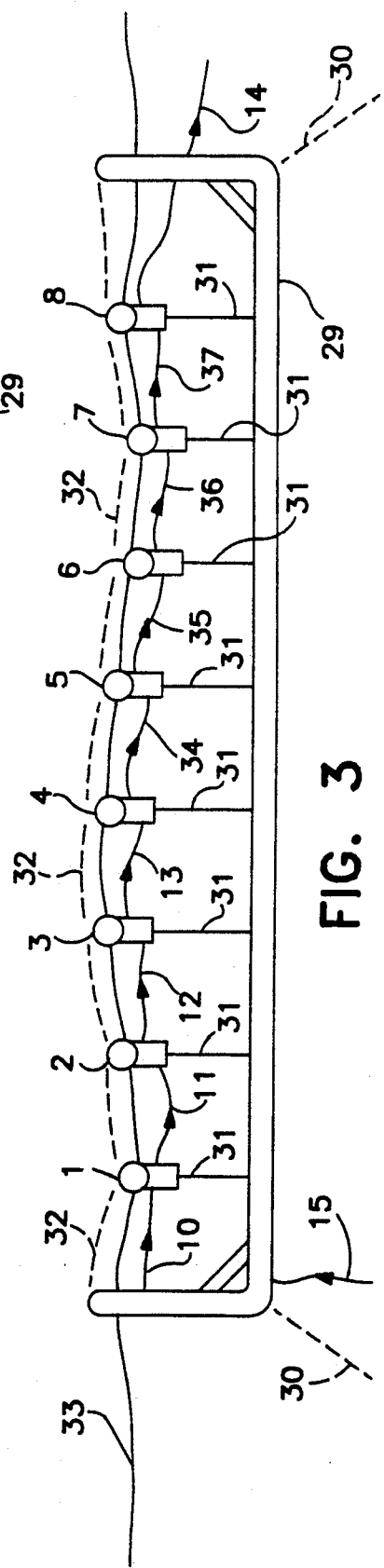
FIG. 2
FIG. 3

WAVE POWERED ENERGY GENERATOR

BACKGROUND OF THE INVENTION

The invention described herein relates to a method and device for generating energy from the motion of waves by conveying a fluid such as a common gas or a liquid through a series of at least two stages, the pressure of the fluid being incrementally increased as the fluid passes under the force of differential pressure between successive stages.

Due to the environmental, and financial costs of conventional fossil fuel or nuclear energy generation methods, many attempts have been made to harness waves and wind to generate energy in a useable form primarily as electricity. In the case of wave energy generation, many devices have been proposed which utilize a float which rides up and down with wave motion and a fixed or anchored member which remains relatively stationary. An air compression cylinder is introduced between the float and the anchored member, together with associated intake and output conduits and check valves in order to produce compressed air as the float rises and falls with the wave action. Variations to such conventional devices have been made to pressurize liquids or pump water to fill a water reservoir on shore. The pressurized fluid, air or water is then used to drive a conventional turbine and electric generator to convert the energy stored in the pressurized fluid into electrical energy.

U.S. Pat. No. 644,093 to Place (issued Feb. 29, 1900) describes a conventional marine air compressor as outlined above which also includes a submerged reservoir. The submerged reservoir is positioned below the float and air compression cylinder, and remains relatively stationary in deeper waters away from the active wave surface. The reservoir is anchored to the ocean floor and is connected in line between the air compression cylinder and the compressed air output conduit. A fluid filled dampening piston-cylinder arrangement is provided within the reservoir to compensate for the rise and fall of the water surface between high and low tide in ocean applications.

U.S. Pat. No. 4,754,157 to Windle (issued Jun. 28, 1988) describes several further variations upon conventional float type wave energy extraction devices including means to extract energy from both the rise and fall of the float and describing a number of such devices connected in parallel to fill a water reservoir.

Single float type units are also described in U.S. Pat. No. 1,665,140 to Master, 2,487,228 to Kriegel, 3,515,889 to Kammier, 4,203,294 to Budal et al and 4,560,884 to Whittecar whereas multiple parallel arrays of such units are described in U.S. Pat. No. 1,264,737 to Woods, 4,204,406 to Hopfe, 4,408,454 to Hagen et al, and 4,622,473 to Curry.

Conventional single unit devices and multiple arrays of units conventionally connected in parallel suffer from the disadvantage that a minimum amplitude of wave must be encountered before the pressure in the cylinder reaches a level at which useable pressurized fluid is generated.

As a result, waves having an amplitude below such a minimum do not generate any energy. The minimum amplitude is determined by the design of the air compressing cylinder, and this disadvantage is present in both single unit devices and multiple unit parallel arrays of the conventional methods and devices.

To clearly illustrate this point the following example is presented.

| Assuming: intended | intake pressure | $p_\bullet = 14$ psi |
|---|---|---|
| | design output pressure | $p_f = 250$ psi |
| | air cylinder internal diameter | $d = 10$ in |
| | air cylinder intake chamber length | $l_\bullet = 60$ in |
| | initial volume | $V_\bullet = \frac{1}{4} \pi d^2 l_\bullet$ |
| | final volume | $V_f = V_\bullet P_\bullet/p_f = \frac{1}{4} \pi d^2 l_f$ |
| | since | $PV$ = constant at a constant temperature |
| | solving for | $l_f = l_\bullet P_\bullet/P_f = 3.36$ inches |

In summary, before compressed gas of 250 psi opens the check valve and exits the chamber, the piston must move over 56 inches or 95% of its full stroke. From the above example, it can be seen that the larger the difference $\Delta P$ between intake pressure $p_\bullet$ and output pressure $P_f$ the larger the wave and longer the air cylinder length must be before any compressed gas is outlet from the device (as represented mathematically $l_f = l_\bullet P_\bullet/P_f$). As in the above example, the outlet of the chamber has a check valve which will only open to exhaust compressed gas when the pressure of the gas is equal to or greater then 250 psi. If a wave is encountered which is less than the minimum amplitude (56.64 inches) the gas is pressurized to a level less than 250 psi and no compressed gas is outlet. In effect the potential energy stored in the compressed gas generated at less than the final design pressure is not captured since the outlet valve does not open. The potential energy of the compressed gas below 250 psi is dissipated as the wave subsides and the gas decompresses.

Lowering the design pressure will increase the volume of compressed air generated and will capture energy from waves of lesser amplitude (i.e. if $P_f = 125$ psi then $l_f = 6.72$ inches; if $P_f = 50$ psi then $l_f = 16.8$ inches). This design choice is of little practical value since with compressed gases of lower pressure higher volumes must be conducted and low pressure gases are of lesser value in driving turbines. The decrease in pressure output is not offset by the decrease in minimum wave amplitude (i.e. from $P_f = 250$ to 50 psi the minimum wave amplitude changes from 56.64 inches to 43.20 a net change of only 13.44 inches or 24%).

The conventional parallel arrays of compression units do not address this disadvantage and the total volume of energy captured is increased only by increasing the number of compression units. This solution is not cost effective given the capital cost of building an array of units and the operational cost of maintaining them at sea.

It is therefore desirable to provide a device which can capture energy from a wide range of wave amplitudes.

It is also desirable that such a device produce compressed gas or pressurized liquid in sufficient volume and at a high enough pressure to make the device economically viable.

SUMMARY OF THE INVENTION

The invention described herein addresses the disadvantages of the conventional devices and methods and provides for generating energy from waves in a novel and useful manner.

According to the invention there is provided a method of generating energy from the motion of waves upon the surface of a body of water including the steps of: conveying a fluid through a series of at least two stages, and incrementally increasing the pressure of the fluid as the fluid passes under the force of differential pressure between successive stages from an initial pressure input to an initial stage to a final pressure output from a final stage. The output from each preceding stage is input to its succeeding stage in series. The fluid pressure in each stage is increased as a result of relative movement between a first and an associated second member of the respective stage. The first member is immersed in or floated on the body of water rising and falling with the rise and fall of wave motion. The degree of movement of the first member is much greater than the degree of movement of the associated second member.

According further to the invention there is provided a device for generating energy from the motion of waves upon the surface of a body of water including a series of at least two fluid pressurization units. Each unit has a first member and an associated second member. The first member is at least partially immersed in the body of water, rising and falling with the rise and fall of the wave motion. The second member is anchored. Each unit includes pressurization means such as a cylinder piston arrangement engaging the first and second members for increasing the pressure of a fluid as a result of the relative movement between the first and second members as the fluid passes under the force of differential pressure from an inlet to an outlet of each unit. Conduits communicate in series between the outlet of each unit and the inlet of an associated succeeding unit for conducting fluid through the series of units. Check valves are provided in the conduit circuit for conducting fluid in a single direction through the series of units, thereby incrementally increasing the fluid pressure within each unit in succession as the fluid passes from the inlet of an initial unit at an initial pressure to the outlet of a final unit at a final pressure.

By compressing the gas or pressurizing a liquid in incremental steps, each step increasing the fluid pressure a relatively small amount as the fluid proceeds through compression units arranged in series, the invention provides the capacity to design a large volume output capacity at relatively high pressure as will be described in detail below.

BRIEF DESCRIPTION OF DRAWINGS

In order that the invention may be clearly understood, two embodiments of the invention will be described by way of example with reference to the accompanying drawings.

FIG. 2 is a plan view of a series array of sixteen pressurization units moored to a hollow tubular frame which is buoyant to a slight degree and is anchored to the sea floor.

FIG. 3 is an elevation view along line 3—3 of FIG. 2.

BEST MODE OF CARRYING OUT THE INVENTION

Figure 1:
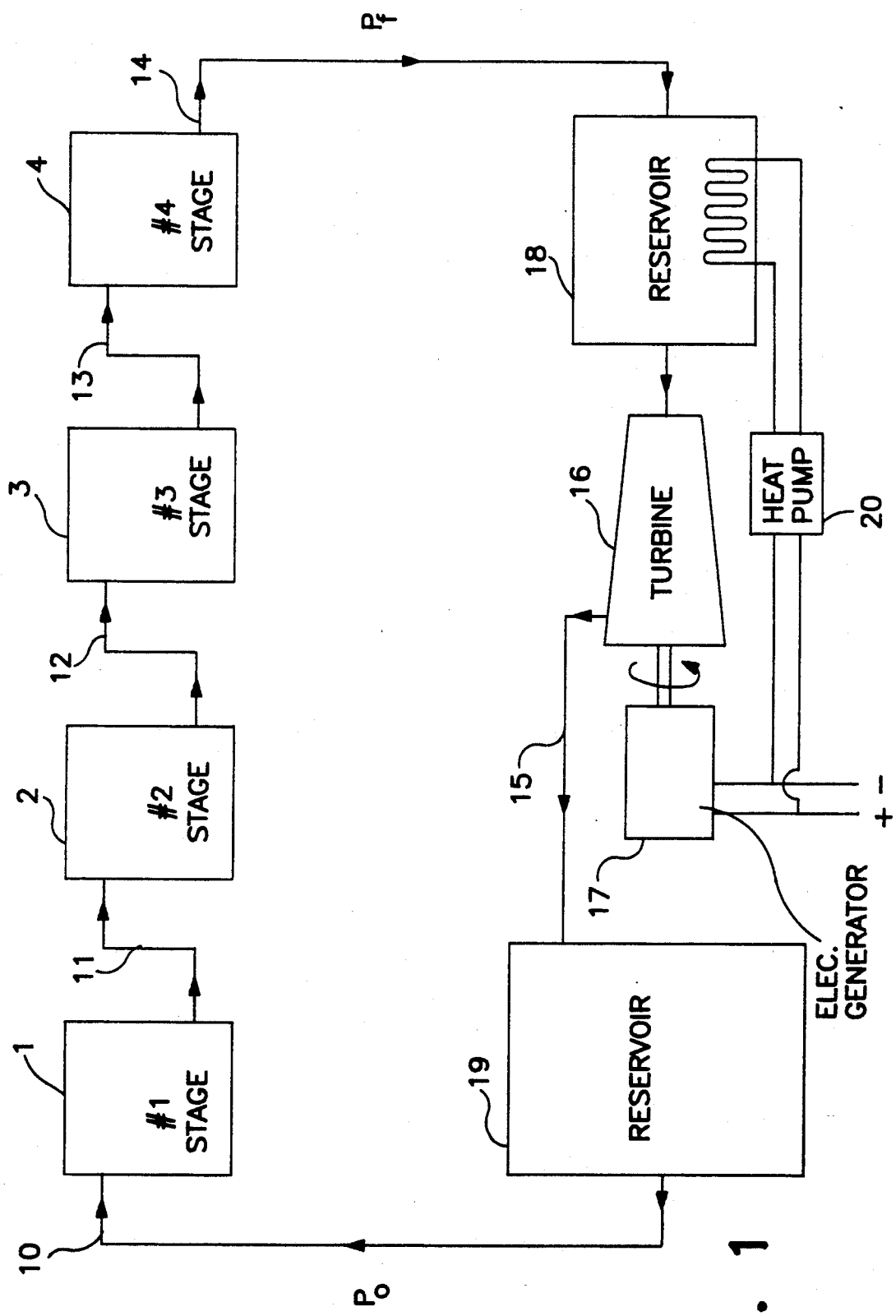
FIG. 1 is a schematic diagram of a closed loop series arrangement according to the invention having four pressurization units connected in series.

Referring to FIG. 1, the general scheme of the invention is shown in a closed loop circuit although fluid may be input at the initial stage and exhausted after exiting the turbine if desired. The device shown in FIG. 1 has only four stages for ease of illustration only and it will be understood that the choice of number of stages is a design choice depending upon a number of design parameters. The invention is applicable to any fluid (i.e. gas or liquid). A first embodiment will be described in respect of a gas compression device and a second embodiment relating to liquid will be described thereafter pointing out the changes necessary to adapt the invention to liquid.

In the first embodiment, gas is conveyed through a series of four stages in FIG. 1. The gas pressure is incrementally increased as the gas passes under the force of differential pressure between successive stages. The gas is input via intake conduit 10 to the initial stage 1 at an initial pressure $P_\bullet$. The gas is output via outlet conduit 14 from the final stage 4 at a final pressure $P_f$. The output of each preceding stage 1, 2, and 3 is input to the succeeding stage 2, 3 and 4 respectively in series via intermediate conduits 11, 12 and 13. The gas pressure in each stage is incrementally increased.

EXAMPLE 1

For example, if equal increments are chosen by design, the incremental change in pressure is one quarter the difference between the initial and final pressures $P_\bullet$ and $P_f (\Delta P = P_f - P_\bullet)/4)$ in FIG. 1. The intake and output pressures are as shown in Table 1 below:

TABLE 1

| Stage | Input Pressure | Output Pressure |
|---|---|---|
| #1 | $P_\bullet$ | $P_\bullet + \Delta P$ |
| #2 | $P_\bullet + \Delta P$ | $P_\bullet + 2\Delta P$ |
| #3 | $P_\bullet + 2\Delta P$ | $P_\bullet + 3\Delta P$ |
| #4 | $P_\bullet + 3\Delta P$ | $P_f = P_\bullet + 4\Delta P$ |

It will be understood that the above example is for ease of understanding only. The incremental pressure increase $\Delta P$ need not be of constant value and the dimensions of the compression chamber in each stage may vary.

The gas at the final pressure $P_f$ is output from the final stage 4 to the inlet of an energy conversion means to convert the energy form as the pressurized gas passes through the energy conversion means. In the embodiment illustrated in FIG. 1, a gas driven turbine 16 drives an electric generator 17. A turbine intake reservoir 18 may be positioned between the final stage 4 and the turbine 16 together with appropriate valve controls to enable the system to build up the final pressure $P_f$ to a level which is optimal for turbine 16 operation. The spent gas is output from the turbine 16 via conduit 15 at a relatively low pressure and may be stored in a turbine output reservoir 19 before being input to the initial stage 1 via intake conduit 10 thereby circulating the gas in a closed loop. The reservoirs 18 and 19 provide for balancing and initializing the system pressures for optimal operation of the turbine 16 and pressurization stages 1, 2, 3, and 4. To optimize energy generation the gas may be heated by a heat pump 20 and a heat exchanger in the intake reservoir 18 upstream of turbine 16 to the optimal gas temperature and pressure for the turbine 16 operation.

A series array of sixteen 1-8 and 21-28 stages is illustrated in FIGS. 2 and 3. The output from each preceding stage is input to the succeeding stage in series via conduits (11, 12, 13, etc.). A relatively rigid hollow grillage frame 29 is anchored to the sea floor with anchor cables 30. Each stage is then anchored to the frame 29 with vertical cables 31 and a network of mooring lines 32. In this way the complete array is maintained in a relatively fixed latitude, longitude and vertical position in which the frame 29 remains in relatively calm subsurface waters. The individual stages are free to follow the vertical motion of the waves on the ocean surface 33 as waves impinge upon the array. In the array shown, the prevalent wave direction is indicated with arrow A in FIG. 2. It is apparent that apart from their interconnection with mooring lines 32 the operation of all stages are independent. The hollow frame 29 may be used as a conduit to supply gas to the input conduit 10, act as the output reservoir 19, and prevent damage to the turbine output conduit 15. The hollow frame 29 is filled with gas and is therefore buoyant enough to maintain it's vertical position in the body of water. The turbine output conduit 15 connects to the frame 29 at a point sheltered from wave action. The input conduit 10 connects the frame 29 to the first stage 1.

Figure 4:
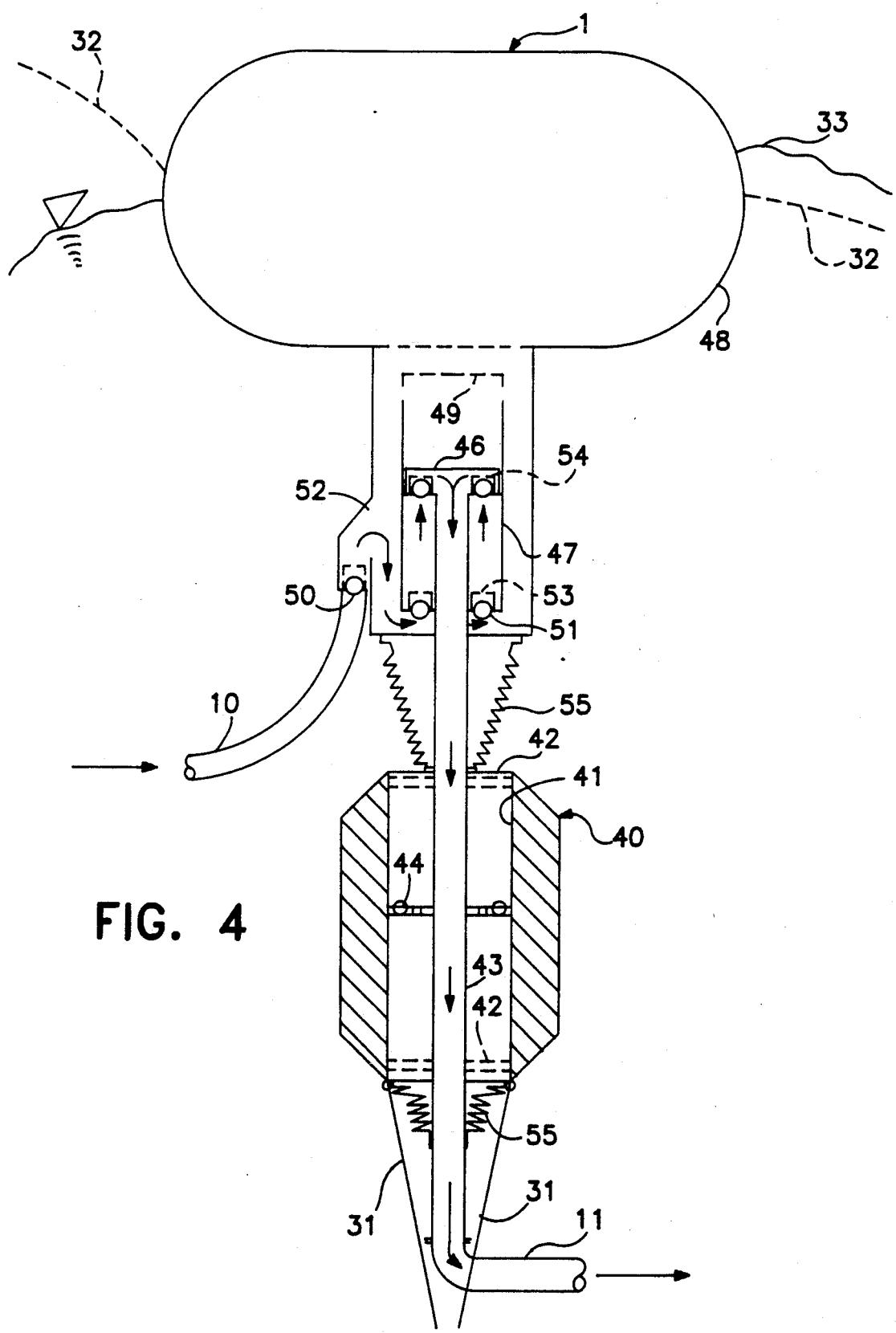
FIG. 4 is a detailed sectional elevation view showing the internal components of a single pressurization unit.

Referring to FIG. 4, the construction and operation of each stage is illustrated. For the purpose of illustration only, the reference numerals relate to the first stage 1, however, it will be understood that every stage is similar, the different input and output pressures dictating variations in piston and chamber dimensions and valve, conduit and float operation pressure.

Gas at the initial pressure $P\bullet$ is input into the stage 1 or pressurization unit 1 via intake conduit 10 and is output to the succeeding stage 2 via conduit 11 at an incrementally increased pressure $P\bullet + \Delta P$.

A tide accommodating submerged float 40 is anchored to the rigid frame 29 by cable 31. The submerged float 40 has a central cylindrical chamber 41 capped at both ends with caps 42. The central piston shaft 43 is slidably guided by the central cap opening to rise and fall with the tide. The piston shaft 43 has a rigidly attached baffle plate 44. The baffle 44 may be perforated or may have a gap separating it from the chamber 41 walls. The baffle plate 44 assembly is surrounded by liquid (preferably of higher viscosity than water) within the chamber 41. As will be explained in detail below the submerged float 40 assembly allows the piston 46 to remain relatively stationary during wave encounters but allows the piston 46 to gradually rise and fall with the tide. As the tide rises and falls the piston head 46 engages the upper and lower ends of the compression chamber 47 under the action of waves and the piston head 46 gradually rises and falls with the tide. The submerged float 40 also acts as a shock absorber between the anchor cables 31 and the floating upper portion of the pressurization unit 1, thereby reducing impact loads upon the cables 31.

A surface float 48 is at least partially immersed in the body of water 33 and rises and falls with the rise and fall of the wave motion. Apart from the interconnecting with relatively slack mooring lines 32 the surface floats 48 of each stage are independently operated from each other. The surface float 48 is preferably a hollow pressure vessel which serves to store compressed gas acting as a reservoir and to ensure that on each stroke of the piston 46 within the compression chamber 47 that a sufficient volume of gas may be supplied to optimize the energy captured from each wave.

The piston 46 is slidably housed within the compression chamber 47. For ease of illustration the embodiment shown in FIG. 4 captures compressed air only upon a rising wave, however, it will be apparent that conventional valve and manifold arrangements may be devised to capture compressed air resulting from a falling wave as well, thereby making the piston-chamber device a double-acting cylinder well known to those skilled in the art.

When the piston head 46 is at its fully extended intake position the piston head 46 engages the upper end 49 of the compression chamber 47. The chamber 47 has filled with gas as the vacuum created by the falling surface float 48 draws gas through check valves 50 and 51 and the surrounding gas supply manifold 52. As the surface float 48 rises with an incoming wave the gas pressure increases as the piston head 46 moves toward the bottom end 53 of the compression chamber 47. When the gas in the compression chamber 47 is pressurized to the final output design pressure for the particular stage (see Table 1 for examples) the upper check valves 54 in the hollow piston head 46 open to allow the pressurized gas to flow into the hollow piston shaft 43 and through conduit 11 to the succeeding stage (2 in this example). Perforations in the upper end of the compression chamber 47 and the bottom of the surface float 48 ensure that gas is supplied in sufficient quantity without excessive friction losses in pressure.

Figure 6:
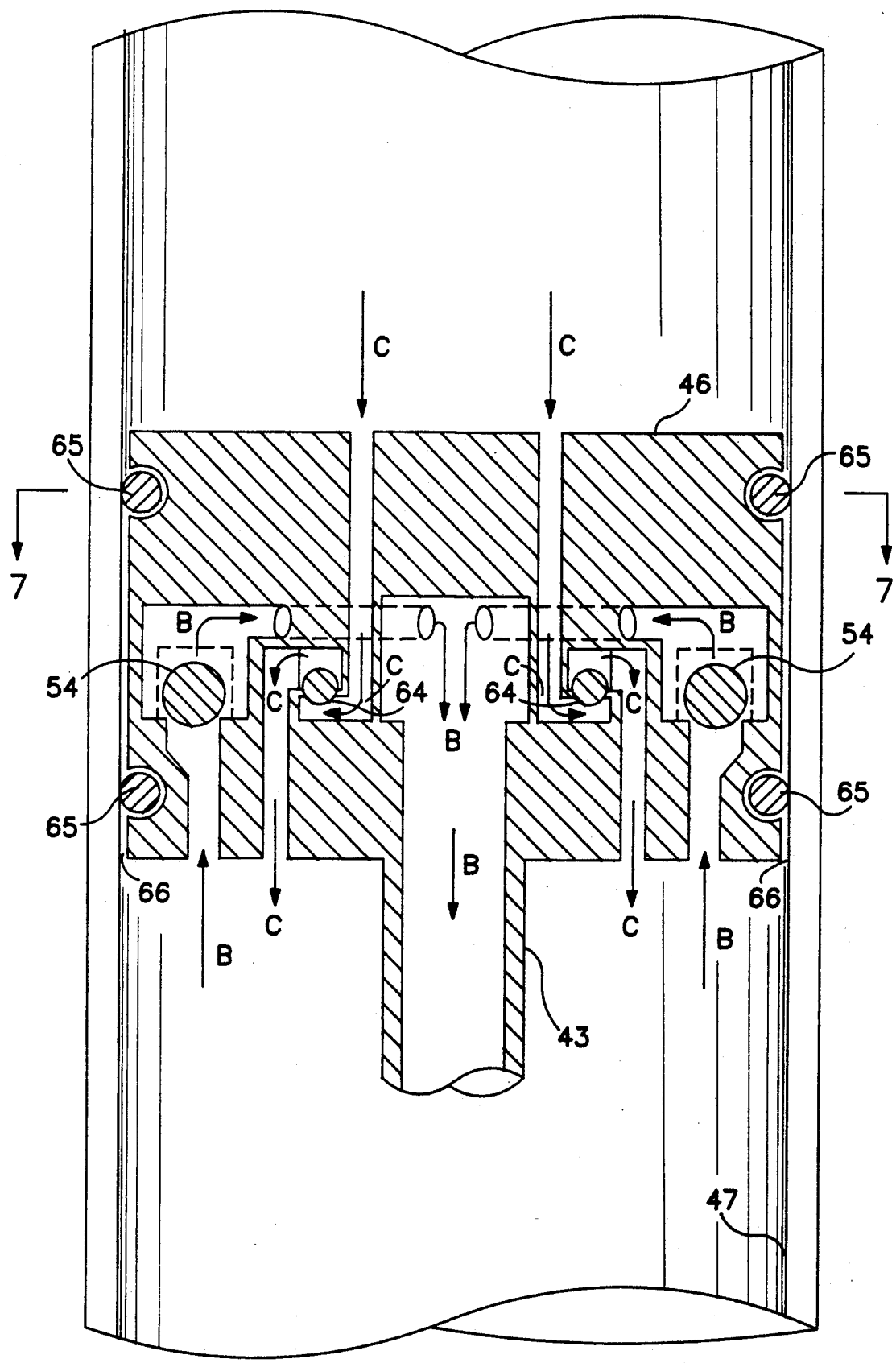
FIG. 6 is a detail sectional view through the piston showing valves and guide rollers housed in the piston.
Figure 7:
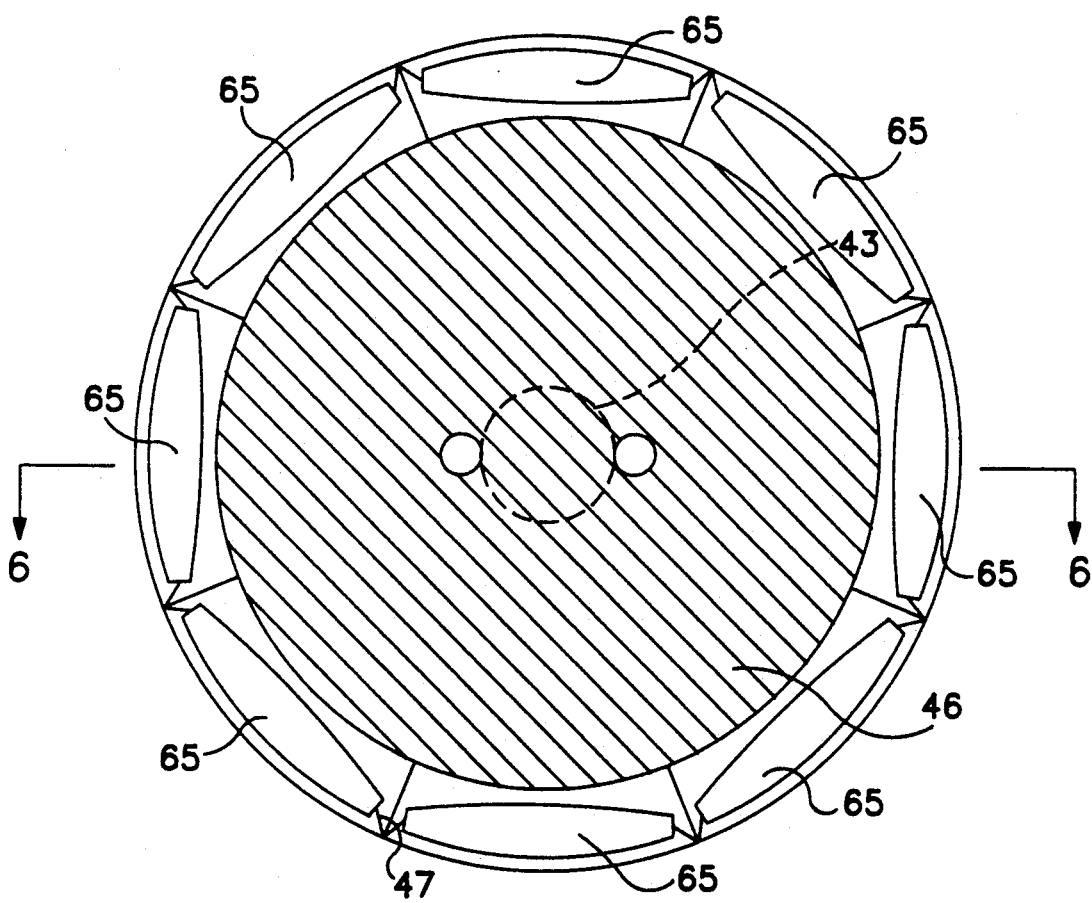
FIG. 7 is a detail sectional view along line 7—7 of FIG. 6.

Referring to FIGS. 6 and 7, a preferred piston head 46 assembly is shown. When the pressure in the chamber 47 reaches the design pressure, compressed gas is exhausted through ball valves 54 into the hollow piston shaft 43 as indicated by arrows B. In order to quickly recharge the chamber 47 with gas as the piston 46 rises within the chamber 47, ball valves 64 operate to the open position to allow gas to pass through the piston head from the upper side of the piston head 46 to the lower side of the piston head 46, as indicated by arrows C.

As previously described, the incremental increase in gas pressure through each stage is relatively low. An advantage of this feature of the invention is that the piston 46 need not be precisely in engagement with the internal walls of the chamber 47. Typically conventional piston cylinder assemblies includes piston rings and/or a film of oil between the precisely mated piston and cylinder to prevent the escape of compressed gas. Due to the relatively low incremental increase in pressure between the upper and lower sides of the piston head 46 it is practical to provide rollers 65 within the piston head 46 to engage the chamber 47 walls. The use of rollers 65 journalled in appropriate bearings reduces friction and substantially reduces assembly and maintenance costs since precise alignment of the piston 46 and chamber 47 is not required. The gap 66 between the piston 46 and chamber 47 allows an insignificant amount of pressurized gas to escape since the incremental increase in pressure during compression is relatively small. The two circumferential banks of rollers 65 may be rotationally offset from each other to further impede the flow of escaping gas.

Bellows 55 isolate the sliding portions of the piston shaft 43 from the corrosive sea water and floating debris. If sea water is used as the pressurized liquid in the system the bellows 55 are not necessary.

Although the piston shaft 43 may move during wave action, the degree of movement of the surface float 48 is substantially greater than the degree of movement of the associated piston shaft 43. The submerged float 40 is submerged below the upper layer of sea water influenced by wave action and the baffle plate 44 and chamber 41 arrangement ensures that the piston shaft 43 remains substantially stationary when relative to the surface float which rides the wave surface 33.

It will be apparent that the above described invention is adaptable to use any common gas such as air or nitrogen gas, and any liquid such as water. In a closed loop series arrangement dry nitrogen gas is preferred due to its relative abundance and low price, negligible environmental concerns associated and non-corrosive qualities.

Figure 5:
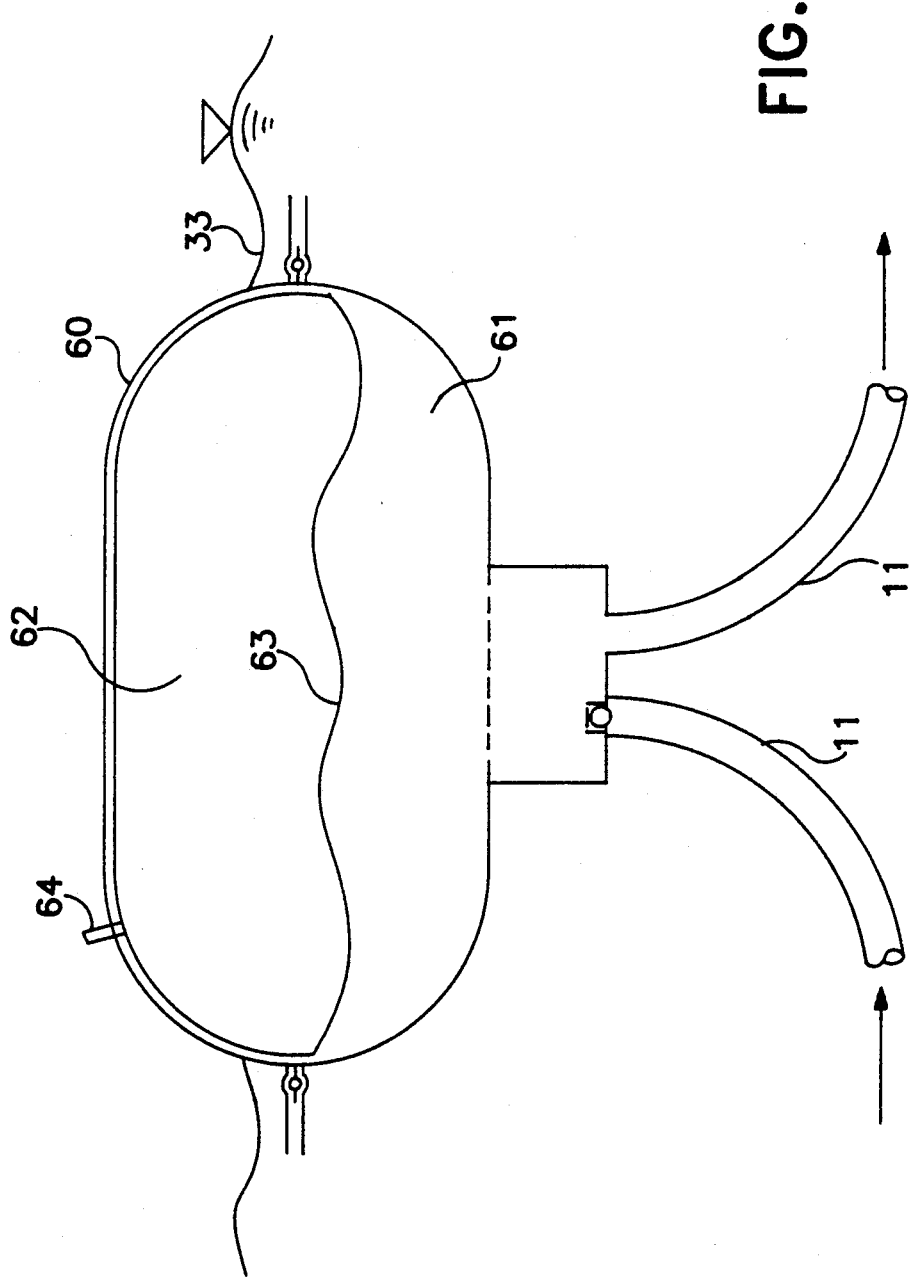
FIG. 5 is a detail sectional elevation view showing the internal components of a holding tank used in association with a second embodiment wherein liquid is pressurized.

To adapt the invention to pressurize a liquid such as water, intermediate holding tanks 60 shown in FIG. 5 are introduced between each stage. In the liquid filled embodiment, the surface floats 48 are sealed air filled vessels to retain buoyancy and are not in communication with the water supply manifold 52. The intermediate holding tanks 60 are moored to the frame 29 in a manner like the individual stages, however since they are only for holding liquid it is not necessary for them to maintain a large degree of buoyancy and are free to ride the wave surface 33. A liquid chamber 61 communicates between the outlet of a preceding unit or stage (1) and the inlet of a succeeding stage (2) via conduit 11. A compressible gas filled isolated chamber 62 is separated from the liquid chamber 61 by a flexible diaphragm 63. Preferably the diaphragm 63 is formed as a sealed tube 63 secured to the holding tank 60, at its midline. Air pressure is maintained in the isolated chamber 62 by introducing air through a valve 64. At initial start-up of operations, the shape of the tube 63 conforms to the shape of the holding tank 60. Each holding tank 60 and tube 63 is initially pressurized at a predetermined pressure for that stage. (For example, as described in Example 1; the holding tank 60 after the first stage 1 would be initialized at pressure $P\bullet + \Delta P$; the holding tank 60 after the second stage at $P\bullet + 2\Delta P$, etc.) As liquid is pumped into chamber 61, the air pressure in chamber 62 increases as does the liquid pressure in chamber 61. The pressures in chambers 61 and 62 always equal and maintain an equilibrium. Since air is compressible, the volume of chamber 62 decrease as the volume of the liquid in chamber 61 increases with an accompanying increase in pressure. If the inflow equals the outflow of liquid in operation the pressure remains constant.

I claim:

1. A method of generating energy from the motion of waves upon the surface of a body of water comprising:
   conveying a fluid through a series of at least two stages; and
   incrementally increasing the pressure on the fluid as the fluid passes by means of a differential pressure, between successive stages from an initial pressure input at an initial stage to a final pressure output at a final stage, the output from a preceding stage being input to the succeeding stage in series, the fluid pressure in each stage being incrementally increased in a compression chamber by means of relative movement between a first and an associated second member of the stage which form said compression chamber, said first member being at least partially immersed in the body of water and including a buoyant float member for floating on said surface and thereby rising and falling with the rise and fall of wave motion, said second member, in use, being positioned beneath said surface and slidably carrying a conduit extending into said compression chamber, the degree of movement of the first member in response to the motion of waves being greater than the degree of movement of the second member.

2. A method according to claim 1 wherein the operation of the first member of each stage is independent of the first member of the other stages.

3. A method according to claim 1 comprising:
   conveying the fluid output at the final pressure from the output of the final stage to the inlet of an energy conversion means; and
   converting the energy stored in the pressurized fluid to another energy form as the pressurized fluid passes through the energy conversion means.

4. A method of according to claim 3 including:
   conveying the fluid output from the energy conversion means to the input of the initial stage thereby circulating the fluid in a closed loop;
   storing the pressurized fluid output from the final stage in a reservoir.

5. A method according to claim 3 wherein the energy conversion is carried out with a fluid driven turbine driving an electric generator.

6. A method according to claim 1 wherein said first and second members define a piston and cylinder for forming said compression chamber, said piston being carried on said slidable conduit.

7. A method according to claim 3 comprising: heating the fluid upstream of the energy conversion.

8. A method according to claim 1 wherein the fluid is a liquid.

9. A method according to claim 1 wherein the fluid is a gas.

10. A device for generating energy from the motion of waves upon the surface of a body of water comprising:
    a series of at least two fluid pressurization units, each unit including a first member and an associated second member, the first member being at least partially immersed in the body of water and including a buoyant float member for floating on said surface and thereby rising and falling with the rise and fall of wave motion, the second member being anchored, each unit including pressurization means formed by the first and second members for increasing the pressure of a fluid as a result of the relative movement between the first and second members as the fluid passes under the force of differential pressure from an inlet to an outlet of each unit;
    conduit means communicating in series between the outlet of each unit and the inlet of an associated succeeding unit for conducting fluid through the series of units; and
    check valve means for conducting fluid in a single direction through the series of units, incrementally increasing the fluid pressure within each unit in succession as the fluid passes from the inlet of an initial unit at an initial pressure to the outlet of a final unit at a final pressure.

11. A device according to claim 10 wherein the relative motion of the first member of each unit operates independently of other units.

12. A device according to claim 10 including:
energy conversion means communicating with the outlet of the final unit for converting the energy stored in the pressurized fluid to another form as the pressurized fluid passes through the energy conversion means.

13. A device according to claim 12 wherein the energy conversion means comprises a turbine driving an electric generator.

14. A device according to claim 12 wherein the conduit means communicates between an output of the energy conversion means and the input of the initial unit for circulating the fluid in a closed loop.

15. A device according to claim 10 including a reservoir, the inlet of the reservoir communicating with the outlet of the final unit.

16. A device according to claim 10 wherein the fluid is a gas.

17. A device according to claim 16 wherein the gas is nitrogen gas.

18. A device according to claim 12 wherein the fluid is a gas, the device including heating means communicating with the fluid, upstream of the energy conversion means, for heating the fluid.

19. A device according to claim 10 wherein the fluid is a liquid.

20. A device according to claim 10 wherein the liquid is water.

21. A device according to claim 19 including a holding tank between each adjacent pair of units in the series the holding tank comprising:
a liquid chamber communication between the outlet of a preceding unit and the inlet of a succeeding unit;
a compressible gas filled isolated chamber separated from the liquid chamber by a flexible diaphragm; and
gas pressure maintenance means communicating with the isolated chamber for maintaining the pressure of the liquid and gas as the volume of liquid within the liquid chamber varies.

22. A device according to claim 10 wherein the pressurization means comprises a piston housed within a mating cylinder.

23. A device according to claim 22 wherein the piston includes guide rollers engaging the internal walls of the cylinder.

* * * * *